Aug. 6, 1946.  J. W. JUVINALL ET AL  2,405,504
GLASSWORKING APPARATUS
Filed Sept. 15, 1943  3 Sheets-Sheet 2
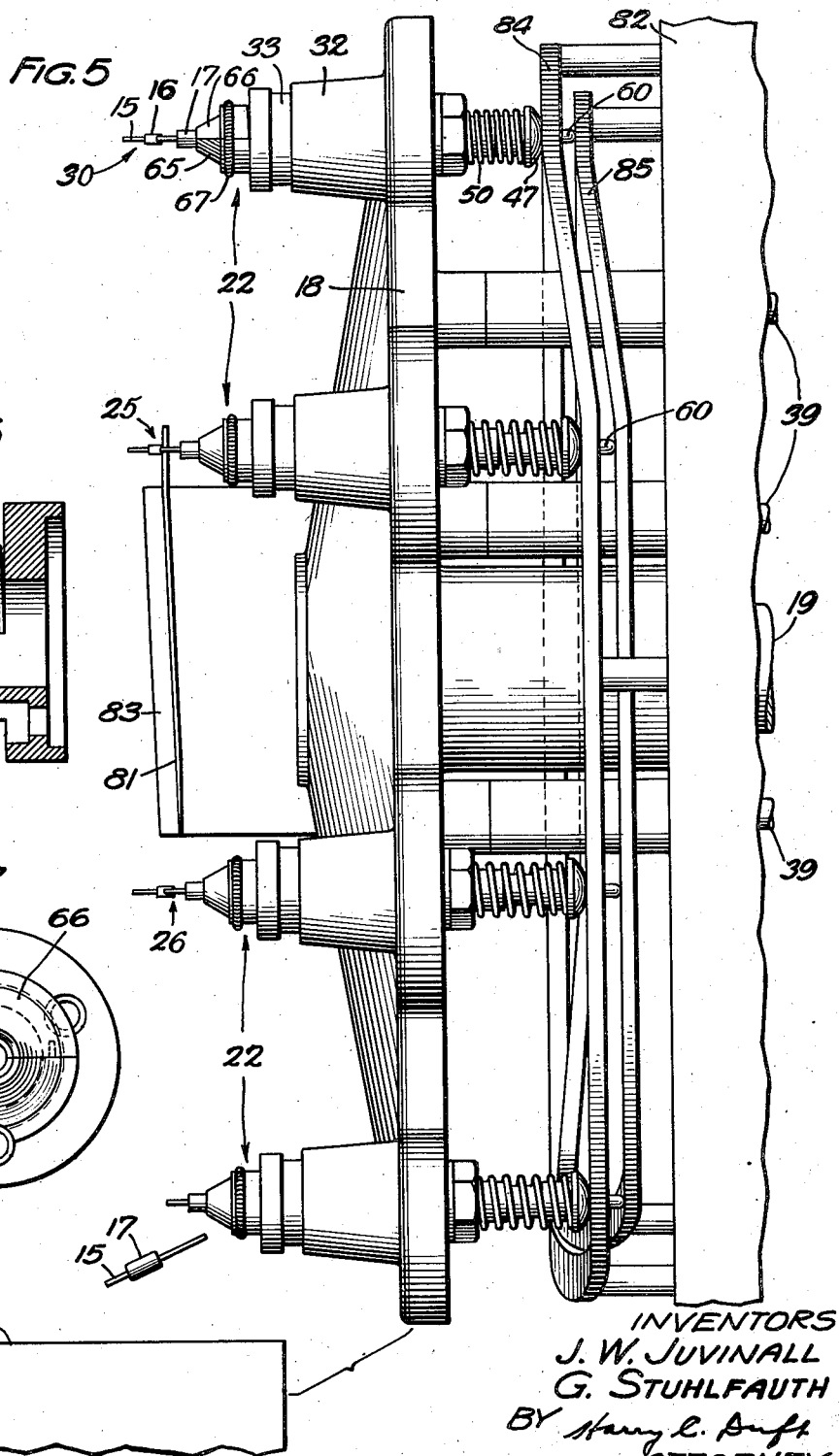

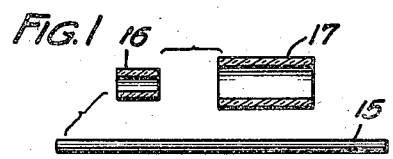
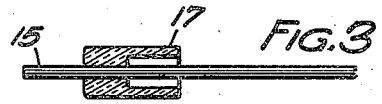
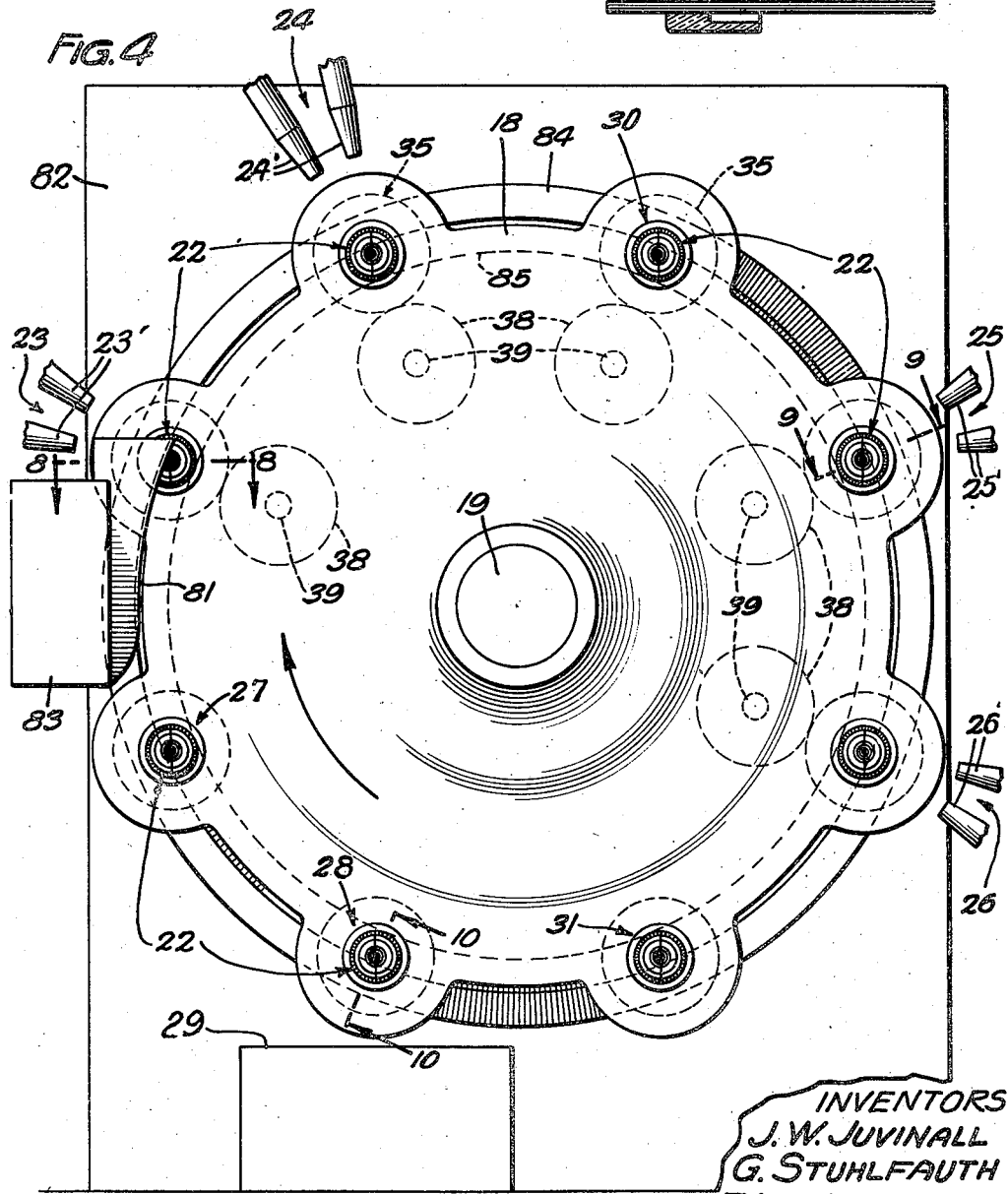

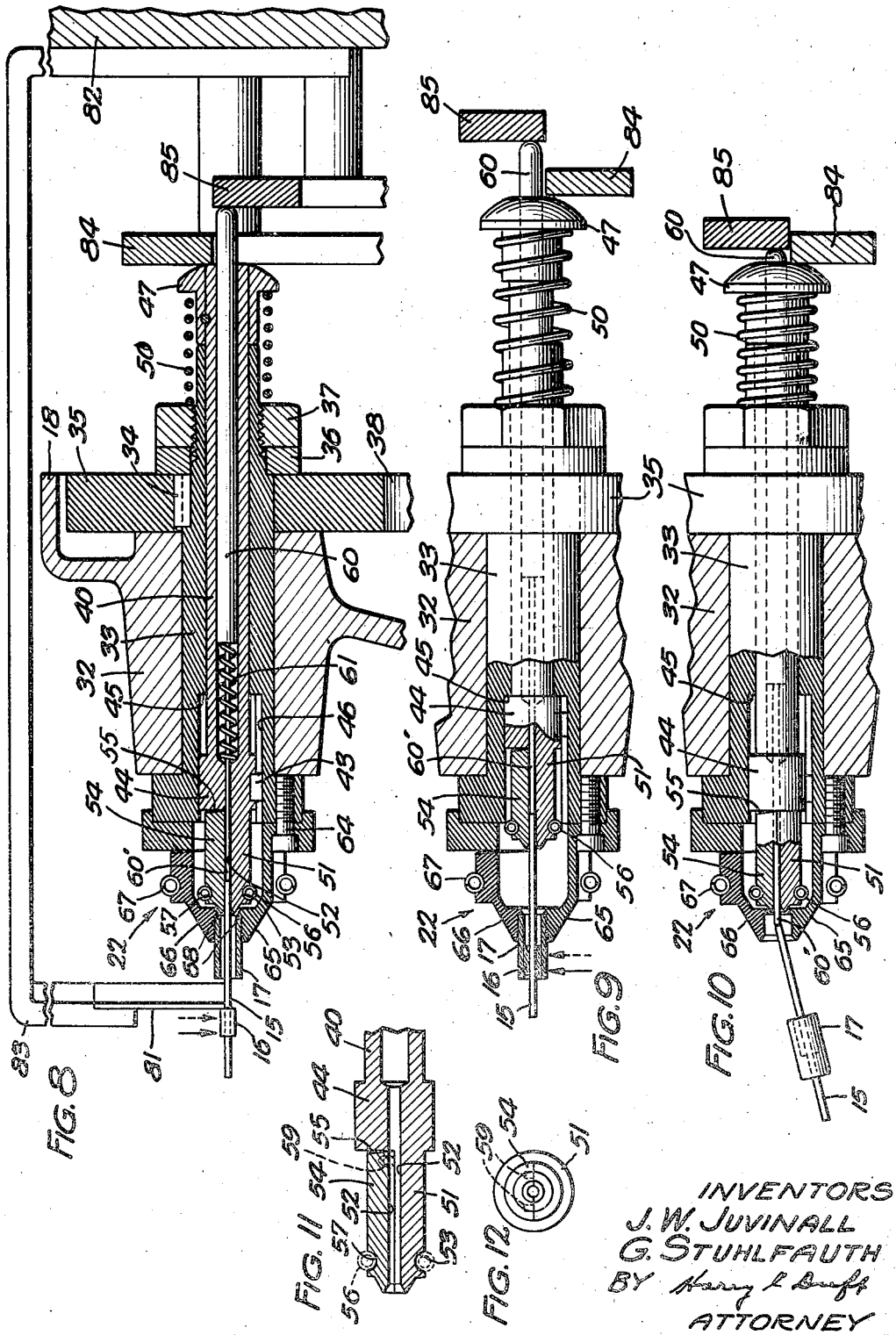

Patented Aug. 6, 1946

2,405,504

UNITED STATES PATENT OFFICE 2,405,504

GLASSWORKING APPARATUS

James W. Juvinall, La Grange Park, and George Stuhlfauth, Chicago, Ill., assignors to Western Electric Company, Incorporated, New York, N. Y., a corporation of New York Application September 15, 1943, Serial No. 502,412

8 Claims. (Cl. 49—2)

This invention relates to glass working apparatus and more particularly to apparatus for assembling and attaching glass beads and glass skirts to lead-in wires of vacuum tubes.

An object of this invention is to provide an apparatus for accurately and expeditiously positioning the heretofore mentioned wires, beads and skirts relative to each other and fusing the bead to the wire and the skirt to the bead.

In accordance with the above object, this invention contemplates, in one embodiment thereof, an automatic machine which includes an intermittently rotatable turret supporting a plurality of circularly arranged devices each comprising a pair of coaxially arranged individually rotatable chucks for receiving a glass skirt and a lead-in wire. At a loading station, the glass skirt and lead-in wire are chucked and a bead is threaded onto the lead-in wire. Thereafter, in the operation of the machine, the bead is first predeterminedly positioned on the wire and at successive stations the bead is fused onto the wire, and the wire and bead predeterminedly positioned relative to the skirt, the skirt then being fused onto the bead, and finally the completed assemblage is ejected from the apparatus.

Other objects and advantages of the invention will be apparent from the following detailed description taken in conjunction with the accompanying drawings, in which Fig. 1 is a view in disconnected relation of vacuum tube parts to be assembled and attached in the use of the apparatus embodying the invention, the glass bead and skirt being shown in section and the lead-in wire in elevation;

Fig. 2 is an elevational view of the lead-in wire with the bead, shown in section, fused thereto;

Fig. 3 is a view similar to Fig. 2 after the skirt shown in section has been fused to the bead and the assemblage completed;

Fig. 4 is a fragmentary elevational view on a reduced scale of the apparatus of this invention as viewed looking towards the left hand side of Fig. 5;

Fig. 5 is a fragmentary side elevational view of Fig. 4 as viewed looking toward the right hand side thereof;

Fig. 6 is a vertical central sectional view on an enlarged scale through one of the skirt-receiving chucks shown in Fig. 5;

Fig. 7 is an elevational view of the chuck shown in Fig. 6 looking toward the left hand side thereof;

Figs. 8, 9 and 10 are enlarged fragmentary plan sections taken on the lines 8—8, 9—9 and 10—10, respectively, of Fig. 4 showing different actuated positions of one of the sets of coaxially arranged chucks in its intermittent advance with the turret;

Fig. 11 is a vertical central sectional view, on an enlarged scale, through one of the lead-in wire chucks; and Fig. 12 is an elevational view of the chuck shown in Fig. 11 looking toward its left end.

Although not limited thereto, apparatus embodying the features of the invention may be employed to advantage for predeterminedly positioning and fusing a glass part to a supporting part and, thereafter, predeterminedly positioning a surrounding second glass part relative to and fusing the same to the first glass part, the assembled and attached parts being used in a vacuum tube. As shown in Figs. 1, 2 and 3, such an assemblage may comprise a lead-in wire or conductor 15, to which is fused a predetermined distance from one end thereof a glass sleeve or bead 16 and to the latter a surrounding glass sleeve or skirt 17, the end of the bead adjacent one end of the wire and one end of the skirt being aligned in the completed assemblage, as shown in Fig. 3.

Referring to the drawings in detail, and particularly to Figs. 4, 5, 8, 9 and 10, the disclosed embodiment of the invention comprises a vertically disposed intermittently rotatable turret or carrier 18 driven from a horizontal shaft 19, the carrier supporting a plurality of equally spaced circularly arranged devices, indicated in general at 22, adjacent its periphery. Any suitable mechanism (not shown) may be employed for effecting an intermittent rotary motion to the shaft 19 and thereby to the carrier 18, whereby the several devices 22 are advanced, step by step, in the direction of the arrow (Fig. 4) past gas flame stations 23, 24, 25 and 26 for fusing the parts, gas burners being indicated at 23′, 24′, 25′ and 26′, and an operator positioned at a loading station 27 for mounting the parts 15, 16 and 17 on each device 22, the completed assemblages being ejected from each device at a station 28 where they drop into a container 29. Cooling stations are indicated at 30 and 31.

The details of the mechanism employed for intermittently rotating the carrier driving shaft 19 have been omitted from this disclosure for the sake of simplicity, since such mechanisms are well known in the art and a disclosure thereof is not believed necessary for it forms no part of and is not essential to a complete understanding of the present invention.

Each of the devices 22 comprises a horizontally disposed bearing sleeve 32 integral with the carrier 18, in which is rotatably journalled an internally and externally shouldered sleeve 33, to which is keyed for rotation therewith, at 34, a driven friction gear 35, which freely turns at one side upon an inner annular face of the bearing sleeve 32 and its opposite side is retained in position longitudinally of the sleeve by a free collar 36 and a nut 37 threaded onto the sleeve 33. The driven friction gears 35, included in each of the intermittently advanced devices 22, are driven at each of the stations 23, 24, 25 and 26, also at the first cooling station 30 following the gas flame station 24, by their engagement with continuously rotating driving friction gears 38 (Fig. 4) during their halt thereat, the gears 38 being fixed to driving shafts 39 (Figs. 4 and 5) rotating about fixed axes. For continuously simultaneously driving the shafts 39 they are connected to a common source of power (not shown). At the loading and ejecting stations 27 and 28, respectively, and at the second cooling station 31, no rotation of the driven gears 35 occurs; therefore, the driving gears 38 are omitted at these latter stations. Slidable longitudinally within the sleeve 33 is a second sleeve 40, which is also internally and externally shouldered and is keyed at 43 to the sleeve 33 for rotation therewith and also to slide therein. Thus, upon rotation of the gear 35, the sleeves 33 and 40 also rotate. The sleeve 40 adjacent its outer end is formed with a head portion 44, fitting within an enlarged bore of the sleeve 33, an annular face 45 at the inner end of the bore serving as a stop face to limit the longitudinal movement of the sleeve 40 inwardly, as shown in Fig. 9. Formed in the enlarged bore of the sleeve 33 is a keyway 46, in which slides the key 43, which is fixed to the sleeve 40. Keyed to the inner end of the sleeve 40 is a flanged collar 47. Surrounding the opposed reduced ends of the sleeve 40 and the collar 47 is a compression spring 50, which normally acts to slide the sleeve 40 inwardly from the position shown in Fig. 8 to abut the inner face of the head portion 44 thereof against the stop face 45 of the enlarged bore of the sleeve 33, as shown in Fig. 9, when the spring is permitted to act in a manner to be described hereinafter.

The extreme outer end of the sleeve 40 is of irregular semi-circular contour and forms an integral fixed chuck portion 51 having a semicircular channel 52 arranged coaxial with the axis of the bore of the sleeve and flared outwardly at its outer end. Peripherally, the chuck portion 51 is flared inwardly at its outer end and adjacent thereto is formed with a semi-circular groove 53. Cooperating with the chuck portion 51 is a movable chuck portion 54, similar in contour to the chuck portion 51, except that its inner end face is slightly inwardly inclined, as indicated at 55, to permit it to move outwardly at its extreme outer end from the chuck portion 51. An annular spring 56 entered in the groove 53 of the chuck portion 51 and a similar groove 57 in chuck portion 54 constantly urges the chuck portions toward each other. To prevent longitudinal displacement of the chuck portions 51 and 54, the portion 51 carries a pair of pins 59 (Figs. 11 and 12), which loosely fit in apertures in the portion 54. The chuck comprising the portions 51 and 54, is adapted to receive a lead-in wire 15 of the type shown in Fig. 1.

Within the sleeve 40 is a two-diameter combined lead-in wire positioning and assemblage ejector plunger 60 having its outer reduced end 60' fitted to the smaller bore of the sleeve and the channels 52 to the chuck portions 51 and 54 and its inner enlarged diameter fitted to the enlarged bore of the sleeve, the extreme inner end thereof extending outside the corresponding end of the sleeve. Surrounding the reduced diameter 60' of the plunger 60 and engaging opposed annular faces of the sleeve 40 and the plunger is a compression spring 61, which normally acts to slide the plunger inwardly from the position shown in Fig. 10, after ejecting the completed assemblage from the device 22, to successive positions shown in Figs. 8 and 9, upon the spring being permitted to act in a manner to be described hereinafter.

Fixed to the outer enlarged end of the sleeve 33, as indicated at 64 (Fig. 8), is a fixed chuck portion 65 and cooperating therewith is a movable chuck portion 66 (Figs. 6 and 7). An annular spring 67 constantly urges the chuck portions 65 and 66 toward each other. The chuck comprising the portions 65 and 66 is adapted to receive a glass sleeve or skirt 17 of the type shown in Fig. 1, the inner end of the skirt being abutted against cooperating shouldered stop faces 68 formed on the chuck portions. Since these chuck portions are in general similar in structure to the lead-in wire chuck comprising the chuck portions 51 and 54, previously described, a further detailed description thereof is not believed necessary.

At the loading station 27 (Fig. 4), a lead-in wire 15 and a glass skirt 17 are manually inserted into the empty laterally yieldable chuck jaws included in each of the devices 22 previously described and a glass bead 16 is threaded onto the lead-in wire to approximately its ultimate position thereon.

In the advance of the chucked parts from the loading station to the gas flame station 23, the bead 16 is moved longitudinally in an outward direction from its original position at the loading station on the wire 15 by its engagement with a stationary cam plate 81 (Figs. 4, 5 and 8). The cam plate 81, which is supported from a fixed frame 82 of the apparatus by a bracket assembly 83, is so shaped and positioned, as clearly shown in Fig. 5, that the inner edge of the bead 16 advancing upwardly in an arcuate path will engage the outer face of the cam plate 81 and thus will be cammed outwardly on the wire 15 to a predetermined position ready for its fusing thereto.

Cooperating with the compression springs 50 and 61 operatively associated with the longitudinally slidable sleeve 40 and the plunger 60, respectively, of the devices 22 are stationary annular cams 84 and 85 (Fig. 5). The cams 84 and 85 are arranged concentric with the axis of the intermittently rotatable carrier 18 and are fixed to the frame 82 of the apparatus. As each of the devices 22 is intermittently advanced with the carrier 18, the flanged collar 47 on the inner end of the sleeve 40 and the inner end of the plunger 60 constantly engage and ride upon the cams 84 and 85, respectively, under the urging of their respective springs 50 and 61, except when the sleeve head 44 is engaged with the stop face 45 on the sleeve 33 (Fig. 9). The cams 84 and 85 have rises and falls so arranged that at predetermined periods in the advance of each device 22, the sleeve 40 and the plunger 60 are moved outwardly against the action of their springs as they ride up the cam rises, and as they ride down the cam falls, the springs act to move the sleeve and plunger inwardly.

In the use of the apparatus embodying the invention, it will be assumed that the carrier 18 is being intermittently rotated in the direction of the arrow (Fig. 4) and during each dwell of successive devices 22 at the loading station 27, an attendant will insert a lead-in wire 15 between the yieldable chuck jaws 51 and 54 and press it inwardly until its inner face abuts the outer end face of the reduced end 60' of the plunger 60. Following this, a glass skirt 17 is inserted between the yieldable chuck jaws 65 and 66 and is pressed inwardly until its inner end face abuts the stop faces 68 of the jaws. Thereafter, a glass bead 16 is threaded onto the lead-in wire 15 to its approximate ultimate position thereon previously mentioned, the position being such that its inner end face will be engaged by the outer face of the cam plate 81 in the advance of the device 22 to the glass flame station 23. At the end of the dwell period, the device 22 last loaded with the parts 15, 16 and 17 is advanced to the station 23 and during such advance, the bead is predeterminedly positioned on the wire 15 by the cam plate 81. Also, the friction gear 35 engages the continuously rotating friction gear 38 and thus through the sleeves 33 and 40 and their chucks, the wire 15 carrying the bead 16 and the skirt 17 are also rotated and at the same time the flames from the burners 23' are focused on the glass bead adjacent its outer end edge, as indicated by the full line arrow (Fig. 8), thereby fusing and attaching the bead at this point to the wire. The device 22 is then advanced to the station 24 and the fusing of the bead to the wire is continued during their dwell thereat, while being rotated by the engaged friction gears 35 and 38, by means of the flames from the burners 24' at this latter station, the latter flames being focused at the point indicated by the broken outline arrow. From the station 24, the device 22 is advanced to the adjacent cooling station 30, where the parts are again rotated by the engaged friction gears 35 and 38. After leaving the loading station 27 and up to and including the dwell at the first cooling station 30, no change in the positions of the parts of the device 22 occurs since the collar 47 on the sleeve 40 and the inner end of the plunger 60 are engaged with and riding upon dwell portions of the cams 84 and 85, respectively.

Shortly after leaving the referred to cooling station 30, the sleeve collar 47 on the sleeve 40 and the plunger 60 ride down cam falls on the cams 84 and 85, respectively, and under the urging of the springs 50 and 61, the wire 15 with the attached bead 16 are moved inwardly into the bore of the skirt 17 to the position shown in Fig. 9, when the device arrives at the gas flame station 25, wherein the outer end face of the bead is located a slight distance inwardly of the outer end face of the skirt, the purpose of which will be described hereinafter. In this latter position of the sleeve 40 the head 44 thereof engages the stop face 45 on the sleeve 33 and the cam 84 is so shaped adjacent the station 25 that it clears the collar 47 on the sleeve 40, as clearly shown in Fig. 9. This arrangement provides a more rigid or positive stop for the sleeve 40 and thus an accurate positioning of the bead 16 in the skirt 17. During the dwell of the device 22 at the station 25, where the parts are again rotated by the engaged friction gears 35 and 38, the gas flames from the burners 25' at this station are focused at the point indicated by the full line arrow (Fig. 9) upon the rotating skirt 17 adjacent its outer end edge and thus fuse the skirt to the bead 16. This latter fusing operation is continued in a similar manner at the gas flame station 26 except that the flames from the burners 26' at this station are focused on the rotating skirt at the point indicated by the broken line arrow (Fig. 9). Upon terminating the dwell at the station 26, the fused assemblage appears as shown in Fig. 3, wherein it will be noted that the displaced outer ends of the bead 16 and skirt 17, previously referred to and shown in Fig. 9, are in alignment, the alignment resulting from a flow of the fused glass. The device 22 is then advanced to the second cooling station 31 and after a dwell thereat, the device is advanced to and dwells at the ejecting station 28, no rotation of the completed assemblage occurring at the latter stations.

Immediately upon leaving the second cooling station 31, the sleeve collar 47 and the plunger 60 ride up cam rises on the cams 84 and 85, respectively, the arrangement being such that upon the device reaching the ejecting station 28, the sleeve 40 has been moved outwardly to its normal position at the loading station 27 (Figs. 8 and 10) and that of the plunger 60 to a position where its outer reduced end 60' is beyond the chuck comprising the jaws 51 and 54, as shown in Fig. 10. It will be obvious that in its movement to the last described position, the plunger end 60' engaging the inner end face of the lead-in wire 15 pushes the completed assemblage from the chuck jaws 51 and 54, whereupon it falls into the container 29. After dwelling at the ejection station 28, the unloaded device 22 advances to the loading station 27 (Figs. 4 and 8) and during such advance the inner end of the plunger 60 rides down a cam fall on the cam 85 and through its spring 61 it is returned to its normal position, shown in Fig. 8, whereupon the attendant proceeds to reload the device and the described cycle of operation is repeated.

It will be understood that the embodiment herein described is merely illustrative of the invention and one application thereof and that modifications can be made and it is capable of other applications.

What is claimed is:

1. In an apparatus for fusing a glass sleeve on a wire, wherein a glass sleeve is slidably positioned on a wire, means in holding engagement with the wire, means operatively engaging the sleeve for moving it on the wire to a predetermined position, a heater adjacent the sleeve, and means operatively engaging the holding means to carry the sleeve in its said predetermined position on the wire within the influence of the heater.

2. In an apparatus for fusing a glass sleeve on a wire, wherein a glass sleeve is slidably positioned on a wire, means in holding engagement with the wire, means operatively engaging the sleeve for moving it on the wire to a predetermined position, a heater adjacent the sleeve, means operatively engaging the holding means to carry the sleeve in its said predetermined position on the wire within the influence of the heater, and means slidable within the wire holding means for ejecting the fused assemblage.

3. In an apparatus for fusing glass sleeves on wires, means in holding engagement with a wire having a glass sleeve about said wire, means operatively engaging said glass sleeve for moving it on the wire to a predetermined position, a heating means adjacent the engaging means to fuse the glass sleeve to the wire in said predetermined position, means in holding engagement with a second glass sleeve about said wire, means operatively engaging the wire holding means to move and telescope the fused sleeve on the wire into the second glass sleeve, a glass fusing heater spaced from the heating means, and means operatively engaging the wire holding means and the glass sleeve holding means to carry the telescoped sleeves to a position adjacent the heater.

4. In an apparatus for fusing glass sleeves on wires, a carrier, means mounted on the carrier in holding engagement with a wire having a glass sleeve slidably positioned about the wire, camming means adjacent the carrier to engage and position the said glass sleeve in a desired position on the wire and for retaining the sleeve in the desired position when the carrier stops, a heater adjacent the carrier to fuse the sleeve in the desired position on the wire, and actuating means operatively engaging and moving the carrier intermittently to effect the positioning of the sleeve on the wire and to carry the positioned sleeve and wire to the fusing heater.

5. In an apparatus for fusing glass sleeves on wires, a base, a carrier intermittently movable on the base, means mounted on the carrier in holding engagement with a wire having a glass sleeve about the wire, means mounted on the base for operatively positioning said glass sleeve on a predetermined part of the wire, a heating means positioned at a predetermined point adjacent the carrier to fuse the sleeve to the wire, means carried by the carrier in holding engagement with a second glass sleeve about said wire, means operatively connected to the wire holding means and controlled by the movement of the carrier to actuate the wire holding means to move and telescope the fused sleeve on the wire into the second glass sleeve, a glass fusing heater spaced from said first-mentioned heating means adjacent the carrier, and means operatively engaging the carrier to move it and bring the telescoped sleeves to the fusing heater.

6. In an apparatus for assembling and attaching glass beads and skirt sleeves to lead wires, a carrier, means mounted on the carrier in holding engagement with a glass skirt sleeve about a lead wire having a glass bead fused thereon, a lead wire holding means operatively connected with the wire and concentric with and reciprocable within the glass skirt sleeve holding means, means operatively engaging the lead wire holding means for actuating it within the skirt sleeve holding means to move the fused bead into the concentrically supported skirt sleeve, a glass fusing heater, and means operatively engaging and moving the carrier to move the glass skirt sleeve adjacent the heater to fuse the skirt sleeve and bead together.

7. In an apparatus for assembling and attaching glass sleeves on wires, a carrier, means mounted on the carrier in holding engagement with a glass sleeve about a lead wire having a glass bead fused thereon, a wire holding means operatively connected with the wire and concentric with and reciprocable within the glass sleeve holding means, means operatively engaging the wire holding means for actuating it within the sleeve holding means to move the fused bead and telescope it into the concentrically supported glass sleeve, a glass fusing heater, means operatively engaging and moving the carrier to move the glass sleeve adjacent the heater to fuse the glass sleeve and bead together, and means slidable within the wire holding means for ejecting the fused assemblage.

8. In an apparatus for assembling and attaching glass beads and skirt sleeves to lead wires, a frame, a turret intermittently rotatable on the frame into a plurality of stations, individual holding means mounted on the turret and holding a skirt sleeve and a lead wire with a bead sleeve loosely supported thereon, a stationary cam mounted on the frame and positioned to engage and move the glass bead sleeve to a predetermined position on the wire, means on the turret for rotating the holding means in said stations, a heater adjacent the stationary cam for fusing the glass bead sleeve to the wire in the said predetermined position, means operatively connected to the wire holding means and controlled by the movement of the turret in moving to one station for actuating the wire holding means axially to move the fused glass bead sleeve within the glass skirt sleeve, and a heating means located at another station for fusing the glass skirt sleeve to the fused bead sleeve.

JAMES W. JUVINALL.
GEORGE STUHLFAUTH.